US00RE36153E

United States Patent [19]

Sing

[11] E Patent Number: Re. 36,153

[45] Reissued Date of Patent: Mar. 23, 1999

[54] CONVERTED LOG STRUCTURAL PRODUCTS AND METHOD

[76] Inventor: Peter Sing, P.O. Box 11532, Winslow, Wash. 98110

[21] Appl. No.: 410,508

[22] Filed: Mar. 24, 1995

Related U.S. Patent Documents

Reissue of:

[64] Patent No.: 5,299,400
Issued: Apr. 5, 1994
Appl. No.: 949,983
Filed: Sep. 24, 1992

[51] Int. Cl.[6] ..... B27C 9/00; E04C 1/00

[52] U.S. Cl. ..... 52/309.9; 52/233; 52/309.11; 52/309.15; 144/340; 144/347; 144/367

[58] Field of Search ..... 52/233, 309.9, 52/309.17, 309.14, 309.15, 309.16, 407.13, 730; 29/428, 457, 459, 525; 144/3.1, 136.1, 136.7, 340, 353, 354, 367, 370, 380

[56] References Cited

U.S. PATENT DOCUMENTS 4,741,144 5/1988 Graffin ..... 52/730.7

FOREIGN PATENT DOCUMENTS 262567 6/1988 Austria ..... 52/233
027 356 10/1990 Canada .
388 507 2/1989 European Pat. Off. .
0518 246 6/1992 European Pat. Off. .
962 589 6/1950 France .
2512 729 3/1983 France .
3516287 3/1987 Germany ..... 52/730.7
924 088 9/1991 Germany .
12 15502 8/1989 Japan .
465 412 9/1991 Sweden .
189073 11/1922 United Kingdom ..... 52/233

OTHER PUBLICATIONS

Patent Abstracts of Japan, vol. 13, No. 256 (M897), 22 Nov., 1989—Abstract of JP–A–12 (above).

Database WPI, Week 8907, Derwent Publications, Ltd., London, GB AN 89–052357 Abstract of SE–B–465 412 (above).

*Primary Examiner*—W. Donald Bray

[57] ABSTRACT

Converted log structural products are produced from conventionally unusable or marginally useful sections of logs transversely cut into suitable lengths and then cut longitudinally by perpendicular cuts into log parts of either right-angled sector or right triangle cross-section. Four log parts matching in size and shape, and positioned so that their right angles form the corners of a rectangle, are assembled into a converted log, the interior space between the four log parts being filled selectively with braces, supports, insulation, concrete for various applications.

14 Claims, 1 Drawing Sheet

CONVERTED LOG STRUCTURAL PRODUCTS AND METHOD

Matter enclosed in heavy brackets [ ] appears in the original patent but forms no part of this reissue specification; matter printed in italics indicates the additions made by reissue.

BACKGROUND OF THE INVENTION

This application is related to my U.S. Pat. No. 5,115,609, issued May 26, 1992, *is a reissue application of my U.S. Pat. No. 5,299,400, issued Apr. 5, 1994,* and covers subject matter not disclosed or claimed in the *first* issued patent.

The *first* issued patent disclosed a method to produce useful lumber products, superior in strength, lightness, handling and costs from trees of 8–10 years' growth as compared to trees aged 35 years and more used for conventional lumber. FIGS. 1 and 2 of the accompanying drawings illustrate the basic concepts of the prior invention. FIG. 1 shows an end view of trimmed debarked log 10, to be converted by dividing it into quarter-segments 12 by two diametrical longitudinal cuts at right angles to each other along planes 14 and 16. Trimming cuts along planes 18, 18' parallel to plane 14 may be performed if desired; obviously, corresponding cuts parallel to plane 16 can be made. As FIG. 2 illustrates, when quarter-segments 12 are rotated so that perpendicularly cut surfaces 20 and 22 face outwardly, segments 12 can be oriented to form a peripheral rectangular cross-section and can be secured together in this position into a length of the converted log product.

It is the principal object of this invention to expand the concepts of the prior art to include the conversion and enhancement of portions of larger logs from older trees, especially those portions now conventionally considered unfit for structural lumber, into strong, light, smooth, easily handled and above all inexpensive structural lumber.

SUMMARY OF THE INVENTION

In the conventional sawing of timber into structural lumber, the rounded portions near the outer circumference of the logs must be discarded; similarly, in logs being cut into thin sheets as laminations for plywood manufacture, the logs being continually rotated during cutting. The wood veneers become unusable when the diameter of the residual log core has been reduced to the range of 6–7 inches, the core then being relegated to use as firewood or pulp. Using these substantially rejected log portions, the present invention advantageously provides building materials of highly desirable characteristics. Additionally, a length of lumber previously made square can be increased in cross-sectional size by mere than 40% without sacrificing strength and with improved insulative and handling by the method disclosed herein.

The present invention uses portions of larger logs which have been trimmed and cut transversely into selected lengths (normally 8 feet). Two longitudinal cuts at right angles to each other provide lengths of log parts, three-sided in cross-section, whether right-angled sectors with the third side contoured by the curvature of the outer log circumference, or right triangles when cut from square logs. In all cases, four equally sized and shaped log parts are assembled by orienting them in reverse of their original position before cutting, with their prior outside surfaces now pointing inwardly, so that the outer peripheral edges of the four log parts as now arranged form a rectangle. The log parts may now be secured together, interiorly braced if desired and the interior space existing between the assembled log parts filled with suitable insulating material or the like.

All the preferred embodiments of the converted log structural products, and the method of producing them, will now be fully described in connection with the accompanying illustrative, but not limiting, drawings, wherein:

SHORT FIGURE DESCRIPTION OF DRAWINGS

DESCRIPTION OF THE PREFERRED EMBODIMENTS

In this application, smaller logs are considered to be those in the range of 4–9 inches in diameter and 6–10 years in age;

larger logs are considered to be those in the range of at least 14 inches in diameter and 35 years and up in age.

Figure 1:
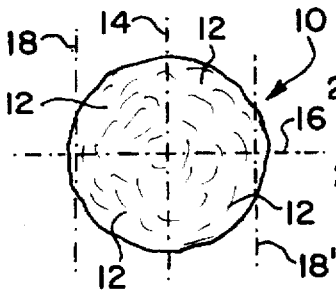
FIG. 1 PRIOR ART
FIG. 1 is a schematic end view of a small log as converted by the prior art method.
Figure 2:
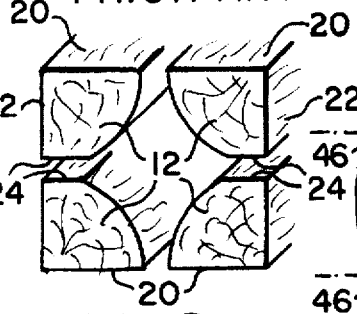
FIG. 2 PRIOR ART
FIG. 2 is a perspective partial exploded end view of the prior art log of FIG. 1 in its cut and reoriented arrangement prior to final assembly.
Figure 3:
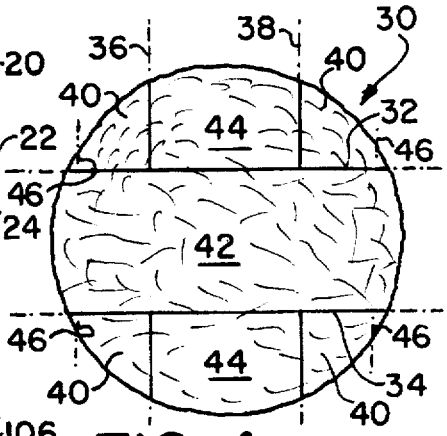
FIG. 3 is a schematic end view of a larger log, showing a plan for dividing the log into portions for use as conventional lumber as well as four equal symmetrical sectors for use in the practice of this invention.
Figure 4:
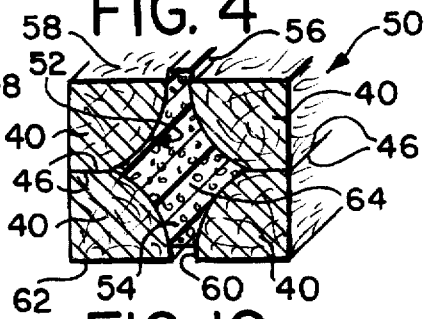
FIG. 4 is a cross-sectional view of the four equal sectors of FIG. 3 rearranged, combined and assembled with foam plastic insulation to form a converted log preferred embodiment of this invention.

FIG. 3 shows larger log 30 with horizontal cut lines 32, 34 and vertical cut lines 36, 38 dividing log 30 longitudinally into four three-sided right-angled equal symmetrical sectors 40. The remaining portions 42, 44 of log 30 may be further divided as desired into conventional lumber beams, planks, etc. Sectors 40 optionally may have one outer edge longitudinally trimmed off and flattened at 46, as shown, or both such outer edges on each sector 40 may be flattened if desired. FIG. 4 illustrates a finished converted log product 50 made by reorienting the four three-sided sectors 40 into outer rectangular configuration, with flattened surfaces 46 abutting in each pair of log sectors 40. As shown, the interior space 52 in converted log 50 is substantially and fittingly filled with pre-formed foam plastic insulating material 54. Projection 56 of insulation 54 extends beyond surface 58 of converted log 50, while corresponding and complementary groove 60 is located directly opposite projection 56 in opposite face 62 of converted log 50. When converted logs 50 are to be assembled at a building site, projection 56 of one converted log 50 is mated with groove [50] *60* of the adjacent one, whereby the registering, aligning and interlocking of converted logs is aided, whether vertically, as shown, or horizontally joined. Centrally disposed opening 64, running the length of converted log 50, may be provided advantageously for convenient installation of electrical conduits, piping or the like.

Figure 5:
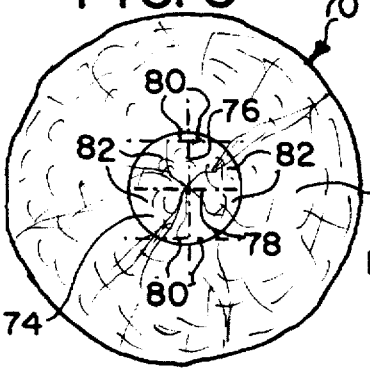
FIG. 5 is a schematic end view of a larger log, demonstrating how, after the outer portion of the log has been cut into layers for lamination into plywood, all in a conventional manner, the central inner core of the log may be longitudinally cut into log portions for use in the practice of this invention.

In FIG. 5, larger log 70 has its outer portion 72 to be used in the conventional manner by being cut into thin layers while log 70 is being rotated. The resulting veneers are to be laminated together to produce plywood (this plywood process not shown, being not directly pertinent to this invention). When log 70 has been reduced by this process to a diameter in the range of 6–7½ inches, cutting is stopped, and remaining core 74 is conventionally set aside as useless for anything other than firewood or pulp. However, for this invention, core 74 represents an ideal inexpensive raw material source, the wood therein being the densest and strongest of all wood from entire log 70.

Figure 6:
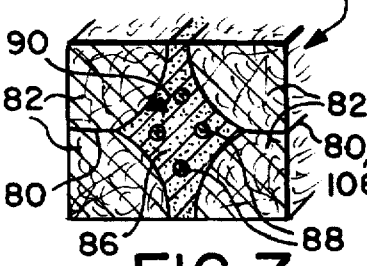
FIG. 6 is a cross-sectional view of the log core parts of FIG. 5, rearranged and assembled into another preferred embodiment of a converted log, its interior space being filled with reinforced concrete.

By longitudinally bisecting core 74 with cuts along perpendicular planes 76, 78, and optionally flattening one or both peripheral edges 80 of the four log parts 82 formed thereby, the component log parts 82 for constructing converted log product 84 of FIG. 6 are provided. In this embodiment, concrete 86, with conventional steel reinforcing bars 88 optionally inserted, is shown filling interior space 90 of converted log product 84. Concrete 86 and reinforcement 88 may be inserted into 84 either at the factory or on location, where the resulting converted log product 84 may be advantageously and economically used to replace railroad ties, in retaining walls and for temporary roads and bridges, to support the weight and resist the stresses of heavy machinery and trucks passing over them. It may be noted that log parts 82, as well as the log parts of all preferred embodiments, may be treated with preservatives, etc. and/or kiln-dried before being assembled into converted log products.

Figure 7:
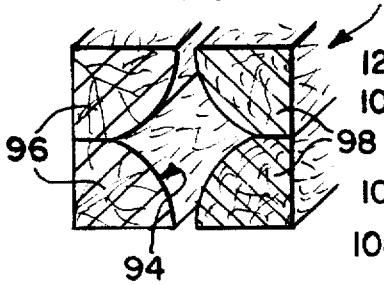
FIG. 7 is a perspective partial end view of four log parts cut and reoriented in accordance with this invention, the log parts being of two different wood species.

The embodiment illustrated in FIG. 7 is converted log product 92 shown in position for assembly but before interior space 94 has been filled. The two log parts 96 shown [onthe] *on the* left are of one species of wood, for example, Douglas fir, while the two log parts 98 are of a different species of wood, for example, cedar. In this way, a wall built with converted log products 92 would provide different interior and exterior surfaces, taking advantage of the unique qualities of grain, hardness, strength and resistance of each species. Many combinations and designs using various suitable woods are possible using this concept.

Figure 8:
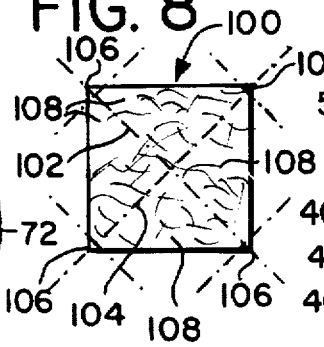
FIG. 8 is a schematic end view of a length of timber squared in cross-section, showing a plan for dividing it into portions for assembly as another preferred embodiment.
Figure 9:
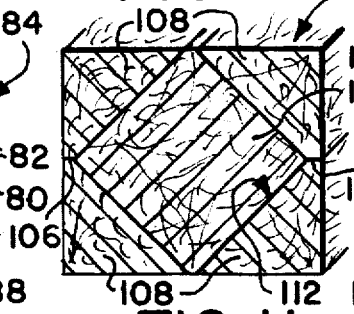
FIG. 9 is a cross-sectional view of the log parts of FIG. 8, rearranged and assembled into a preferred embodiment, its interior space being filled with a softer wood shaped to mate with and fill the interior space.
Figure 10:
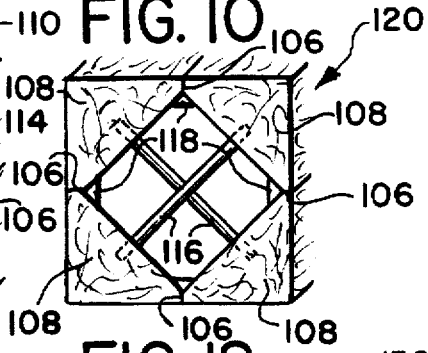
FIG. 10 is a perspective end view of another converted log embodiment, which uses the log parts of FIG. 8 and employs braces and wedge supports for strengthening and sealing the converted log product.
Figure 11:
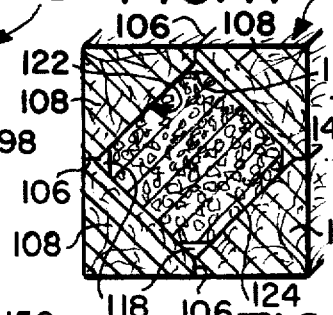
FIG. 11 is a cross-sectional view of the converted log embodiment of FIG. 10, its interior space being filled with treated insulative wood shavings or chips.

FIG. 8 illustrates schematically another way to upgrade timber. Length of lumber 100 shown therein has been previously cut to a square cross-section, and may be converted by diagonal longitudinal cuts along planes 102 and 104 through the corners of lumber 100 and perpendicular to each other. Two or four of outer corners 106 of lumber 100 may be trimmed off and flattened, as desired, producing right-triangular log parts 108 to be used as shown in FIGS. 9–11. Converted log product 110 of FIG. 9 has two corners 106 flattened and is assembled by rotating parts 108, positioning them to form a peripheral rectangular cross-section. Interior space 112 created by this arrangement is illustratively shown fittingly filled with square-shaped filler piece 114 of poor quality wood, such as cottonwood, which is soft, of inadequate strength and therefore impractical for use by itself as structural lumber. However, cottonwood, when used as filler 114, combined with and substantially surrounded by strong log parts 108 and optionally further strengthened and braced as illustrated and described hereinafter with respect to FIG. 10, is transformed into more than adequate inexpensive converted log 110, increased in size more than 40% as compared to timber 110 from which it is made.

In FIGS. 10 and 11, converted log product 120 has its log parts 108 flattened at all corners 106 and thereby presents a square cross-sectional configuration. As seen in FIG. 10, cross-braces 116 may be installed in the assembly of log product 120 and may be spaced along the length thereof, while wedge-shaped braces 118, secured to the inner corners where log parts 108 meet, may extend the length of log product 120 or optionally be intermittently spaced and secured for increased strength and stability of the assembly. FIG. 11 shows interior space 122 of log product 120 filled with wood shavings and/or wood chips 124, which may have been treated prior to installation for resistance to fire, fungus, termites and the like, then moistened with adhesive and blown into interior space 122 to impart effective insulative qualities to converted log product 120. Other insulative materials, both loose and in the form of fiberglass batts, as well as concrete 86 shown in the embodiment of FIG. 6, may be used in place of wood shavings 124. It may be noted that log product 120 is increased in overall size almost 40% over timber 100 from which it is made.

Figure 12:
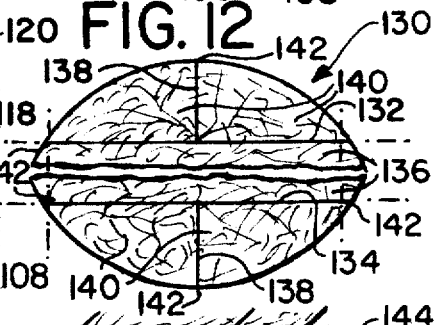
FIG. 12 is a schematic partial end view of a larger log showing an alternative plan for dividing the log into portions for conventional lumber use and four right-angled asymmetrical sectors for use in the practice of this invention.
Figure 13:
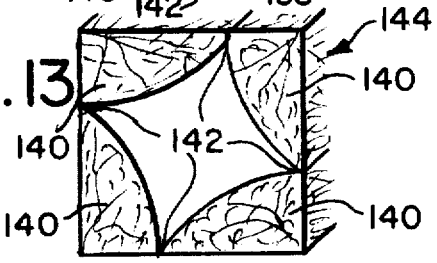
FIG. 13 is a perspective view of still another converted log embodiment using the asymmetric log sectors of FIG. 12.

The larger log 130 of FIG. 12 is divided by horizontal chordal cut lines 132, 134, leaving log portion 136 to be further processed into conventional lumber by conventional cutting techniques. The remaining two log portions are then each split in half by cuts 138 perpendicular to cuts 132, 134. The resulting asymmetric log parts 140 optionally may have their outer edges longitudinally trimmed to flattened areas 142. If log 130 is large enough in diameter, a second set of log portions 140 may be cut therefrom by rotating log 130 90 degrees and repeating cuts 132, 134 and 138; remaining portion 136 would then be largely square in cross-section (not shown). As seen in FIG. 13, log parts 140 may be rearranged in a manner analogous to that of the other embodiments of this invention to form converted log 144, which may then be braced and filled with insulative or strengthening matter as hereinabove described in connection with other embodiments.

Figure 14:
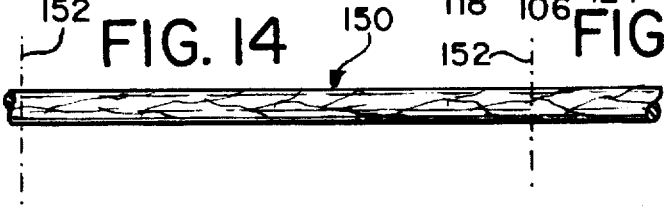
FIG. 14 is a partial side elevational view of a log to be transversely cut into selected lengths before being divided longitudinally in accordance with this invention.

FIG. 14 shows a log 150 to be cut into preselected lengths by transverse cuts 152 for use in the practice of this invention.

The converted log products and method of producing them of this invention have been described in full detail.

Various combinations, substitutions and alternative procedures in the practice of this invention are possible without departing from its concepts, spirit or scope, which are defined and limited only by the ensuing claims, wherein:

I claim:

1. Converted log product, which comprises:

four equally sized parts cut longitudinally from at least one log, said log parts having been cut each to have a three-sided cross-section with two of said three sides being flat and meeting at a right angle, the third of said three sides being selected from the group consisting of: having an arcuate contour, each of said log parts thereby being a right-angled sector in cross-section, and having a flat contour, each of said log parts thereby being a right triangle in cross-section; [and]

*support means for bracing and strengthening the converted log product, said bracing means being positioned at intervals along the length of said log parts within the interior space formed when said log parts are assembled and secured; and* means for securing said four equal right-angled log parts *and said bracing support means* together, said right-angled log parts being positioned when assembled so that said third side of each said log part faces inwardly toward each other, said two of said three sides facing outwardly and oriented to form a rectangular cross-sectional outline for the assembled converted log product.

2. The converted log product of claim 1, wherein said four log parts are right-angled sectors cut at the periphery of said at least one log, remaining portions of said log being available for use as conventional lumber.

3. The converted log product of claim 1, wherein said four log parts are right-angled sectors cut from the conventionally discarded core of at least one log, the outer portion of said at least one log having been removed from said core for conventional uses.

4. The converted log product of claim 3, wherein said log core to be cut into said sectors may range in diameter from [4] *four* to eight inches.

5. The converted log product of claim 2, wherein said four right-angled sectors have been cut from said at least one log's periphery by a first longitudinal chordal cut followed by a second radial cut at right angles to and bisecting said first chordal cut.

6. The converted log product of claim 1, wherein said four equally sized log parts are formed from a log portion previously trimmed to a square cross-section, said square log portion having been quartered by two [diagonal] corner-to-corner diagonal cuts, *said cuts having been made* perpendicular to each other.

7. The converted log product of claim 1, wherein each of said four log parts has at least one of its two corners connecting said third side with one of said two of three sides trimmed off and flattened to provide a flat surface perpendicular to one of said two of three sides.

[8. The converted log product of claim 1, further comprising means for bracing and strengthening the converted log product, said bracing means being positioned within the interior space formed when said log parts are assembled and secured.]

9. The converted log product of claim 1, further comprising insulating and strengthening means filling the interior space remaining between said four log parts and being secured to said parts, forming a unitary converted log product, said insulating and strengthening means being selected from the group consisting of: foam plastic, preformed rigid extruded foam plastic conforming in shape and size to said interior space, loose insulation particles, fiberglass batts, treated wood shavings, treated wood chips, shaped softwood logs, concrete and reinforced concrete.

10. The converted log product of claim 1, further comprising means for interlocking, aligning and registering any two converted log products.

11. The converted log product of claim 1, wherein said four log parts may be selected from wood of at least two species, whereby different contrasting wood surfaces may face the exterior and interior of a building constructed with converted log products so assembled.

12. The converted log product of claim 6, further comprising right-angled wedges secured fittingly in the corners of the interior space created when said four log parts are assembled, thus bracing and strengthening the converted log product resulting therefrom.

13. The method of converting logs into finished dressed structural lumber which comprises the steps of: trimming the logs; cutting logs transversely into selected lengths; cutting log parts therefrom by perpendicular longitudinal cuts so that each log part has a three-sided cross-section with the first two of the three sides having been cut flat and at right angles to each other, the third side being selected from the group consisting of: having an arcuate contour, forming a right-angled sector in cross-section, and having a flat contour, forming a right triangle in cross-section; [and] assembling the lengths of [the] four log parts into position so that the third side of each of the four log parts face toward each other, while the flat first two sides thereof face outwardly and are arranged in a rectangular cross-sectional configuration; *and inserting into the interior space formed in the arranged rectangular configuration, at intervals between and along the length of the four log parts, selectively placed support braces.*

14. The method of claim 13, further comprising at least one step following the longitudinal cutting into three-sided log parts and selected from the group consisting of: treating the log parts with preservatives, kiln-drying the log parts and plane-milling the first two of the three sides of the log parts, in the order here listed.

15. The method of claim 13, further comprising the step of filling the interior space, formed when the three-sided log parts have been assembled in the arranged rectangular configuration, with means for securing the assembled log parts and for strengthening and insulating the resultant converted log assembly.

[16. The method of claim 15, further comprising the step of inserting into the interior space and securing to the log parts selectively placed support braces, prior to the step of filling the space with strengthening and insulating means.]

* * * * *